(12) United States Patent
Hikosaka

(10) Patent No.: US 10,754,112 B2
(45) Date of Patent: Aug. 25, 2020

(54) OPTICAL CONNECTOR

(71) Applicant: YAZAKI CORPORATION, Tokyo (JP)

(72) Inventor: Tomohiro Hikosaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/515,948

(22) Filed: Jul. 18, 2019

(65) Prior Publication Data

US 2020/0049913 A1 Feb. 13, 2020

(30) Foreign Application Priority Data

Aug. 9, 2018 (JP) .................................. 2018-150794

(51) Int. Cl.
| | |
|---|---|
| *G02B 6/36* | (2006.01) |
| *G02B 6/42* | (2006.01) |
| *G02B 6/32* | (2006.01) |
| *G02B 6/38* | (2006.01) |

(52) U.S. Cl.
CPC .............. *G02B 6/4292* (2013.01); *G02B 6/32* (2013.01); *G02B 6/3821* (2013.01); *G02B 6/4228* (2013.01)

(58) Field of Classification Search
CPC ...... G02B 6/4292; G02B 6/4228; G02B 6/32; G02B 6/3821; G02B 6/4246; G02B 6/4204; G02B 6/426; G02B 6/4277; G02B 6/428

See application file for complete search history.

(56) References Cited

U.S. PATENT DOCUMENTS

| | | | | |
|---|---|---|---|---|
| 6,499,889 B1 * | 12/2002 | Shirakawa | ........... | G02B 6/3817 |
| | | | | 257/99 |
| 7,244,067 B2 * | 7/2007 | Mine | .................... | G02B 6/4246 |
| | | | | 385/88 |
| 7,261,470 B2 * | 8/2007 | Miyao | .................. | G02B 6/4292 |
| | | | | 385/70 |

FOREIGN PATENT DOCUMENTS

JP 2013-4437 A 1/2013

* cited by examiner

*Primary Examiner* — Ellen E Kim
(74) *Attorney, Agent, or Firm* — Kenealy Vaidya LLP

(57) ABSTRACT

An optical connector includes a lens body having a lens portion, a fiber optic transceiver having an optical element, a housing, an biasing portion configured to bias the fiber optic transceiver toward the lens portion, and a plurality of abutment convex portions provided on at least one of the lens body and the fiber optic transceiver such that the fiber optic transceiver biased toward the lens body by the biasing portion is arranged in parallel to the lens body with a uniform gap between the fiber optic transceiver and the lens body in a direction along an optical axis of the optical element.

10 Claims, 11 Drawing Sheets

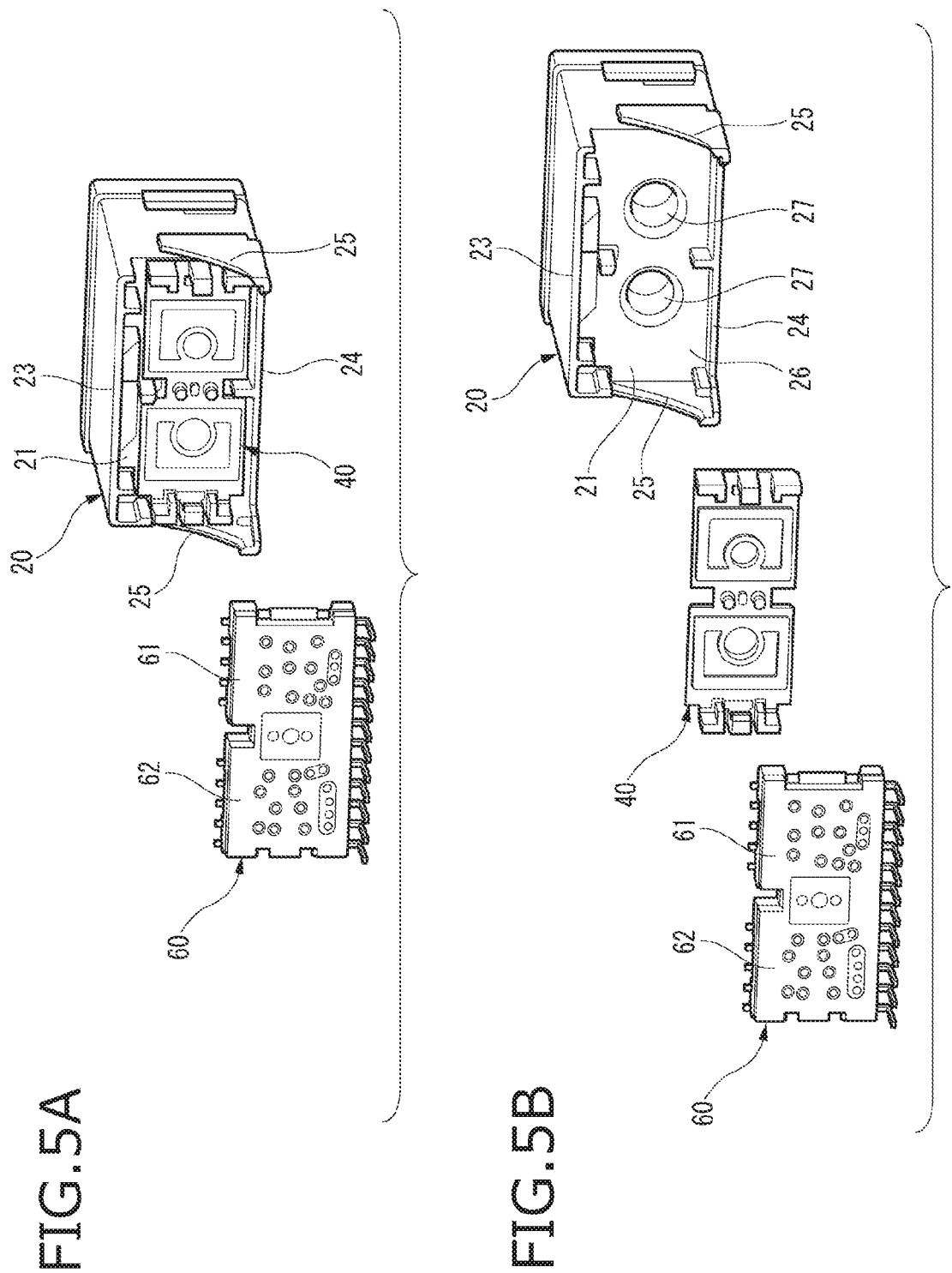

OPTICAL CONNECTOR

CROSS REFERENCE TO RELATED APPLICATIONS

This application is based on Japanese Patent Application (No. 2018-150794) filed on Aug. 9, 2018, the contents of which are incorporated herein by reference.

BACKGROUND OF THE INVENTION

1. Field of the Invention

The present invention relates to an optical connector.

2. Description of the Related Art

An optical connector used in an optical communication field includes a fiber optic transceiver (FOT) having a light emitting element and a light receiving element, and a lens disposed to face the light emitting element and the light receiving element of the FOT (for example, see JP-A-2013-4437). In the optical connector, an optical signal from the light emitting element of the FOT is guided to an optical fiber of a mating optical connector through the lens, and an optical signal from the optical fiber of the mating optical connector is guided to the light receiving element through the lens.

When a resin FOT having a light emitting element and a light receiving element is molded with a mold, the FOT may be bent or warped depending on a cooling condition after molding or the like, so that an optical axis of a FOT optical element may be deviated with respect to an optical axis of a lens when the FOT is combined with the lens. If the deviation of the optical axis occurs, an optical loss between the lens and the optical element increases, which leads to a decrease in performance.

SUMMARY OF THE INVENTION

The present invention has been made in view of the above-described circumstances, and an aspect thereof is to provide an optical connector in which optical axes of a lens and an optical element are aligned with high accuracy to obtain excellent light transmission efficiency.

In order to achieve the above aspect, an optical connector according to the present invention is characterized by the following (1) to (3).
(1) There is provided an optical connector including:
  a lens body having a lens portion;
  a fiber optic transceiver (FOT) having an optical element which is provided at a position facing the lens portion when the fiber optic transceiver is assembled to the lens body;
  a housing having a containing portion in which the lens body and the fiber optic transceiver assembled to the lens body are contained;
  a biasing portion configured to bias the fiber optic transceiver contained in the containing portion toward the lens portion; and
  a plurality of abutment convex portions provided on at least one of the lens body and the fiber optic transceiver such that the fiber optic transceiver biased toward the lens body by the biasing portion is arranged in parallel to the lens body with a uniform gap between the fiber optic transceiver and the lens body in a direction along an optical axis of the optical element.

(2) In the optical connector according to (1),
  the lens portion includes a light emitting side lens portion and a light receiving side lens portion;
  the fiber optic transceiver includes a light emitting side fiber optic transceiver facing the light emitting side lens portion and a light receiving side fiber optic transceiver facing the light receiving side lens portion; and
  at least three of the abutment convex portions are provided around a periphery of each of a light emitting side transmission part between the light emitting side lens portion and the light emitting side fiber optic transceiver and a light receiving side transmission part between the light receiving side lens portion and the light receiving side fiber optic transceiver.

(3) In the optical connector according to (2),
  the biasing portion includes a first biasing portion and a second biasing portion; and
  the first biasing portion and the second biasing portion are respectively arranged on optical axes of the light emitting side fiber optic transceiver and the light receiving side fiber optic transceiver.

According to the optical connector having the configuration (1), if the FOT is biased toward the lens body by the biasing portion; the FOT is disposed in parallel to the lens body with a uniform gap therebetween in the direction along the optical axis of the optical element by the plurality of abutment convex portions. Therefore, even if the FOT undergoes deformation which is bending, warpage, or the like, the FOT can be corrected and disposed in parallel to the lens body, and the optical axis of the optical element of the FOT can be aligned with high accuracy without being inclined relative to the optical axis of the lens portion of the lens body. Accordingly, the optical loss generated between the lens portion and the optical element can be minimized, and excellent light transmission efficiency can be obtained. Further; the lens body, to which the FOT is pressed, is pressed against the housing in the containing portion. Therefore, even if the lens body undergoes deformation which is bending, warpage, or the like, the lens body is also corrected together with the FOT, and the inclination of the optical axis of the lens portion of the lens body can also be reduced or prevented.

According to the optical connector having the configuration (2), at least three of the abutment convex portions are arranged around the periphery of each of the light emitting side transmission part between the light emitting side lens portion and the light emitting side FOT and the light receiving side transmission part between the light receiving side lens portion and the light receiving side FOT. Therefore, the light emitting side lens portion and the light emitting side FOT serving as the light emitting side transmission part, and the light receiving side lens portion and the light receiving side FOT serving as the light receiving side transmission part can be disposed in parallel with high accuracy. Accordingly, the optical axes of the light emitting side lens portion and the light emitting side FOT and the optical axes of the light receiving side lens portion and the light receiving side FOT can be aligned with high accuracy. Therefore, the optical loss generated in the light emitting side transmission part and the light receiving side transmission part can be minimized.

According to the optical connector having the configuration (3), the light emitting side FOT and the light receiving side FOT of the FOT are biased by the biasing portion on the optical axis, so that the optical axes of the light emitting side lens portion and the light emitting side FOT and the optical axes of the light receiving side lens portion and the light receiving side FOT can be aligned with high balance and high accuracy.

According to the present invention, it is possible to provide an optical connector in which optical axes of a lens and an optical element are aligned with high accuracy to obtain excellent light transmission efficiency.

The present invention has been briefly described as above. Details of the present invention will be further clarified by reading a mode (hereinafter, referred to as "embodiment") for carrying out the present invention described below with reference to the accompanying drawings.

BRIEF DESCRIPTION OF DRAWINGS

FIG. 4A is a perspective view of the optical connector as seen from a rear side. FIG. 4B is a perspective view of a housing and a shield case as seen from the rear side.

FIGS. 5A and 5B are perspective views illustrating an optical module containing portion of the housing. FIG. 5A is a perspective view of an FOT and the housing to which a lens body is attached as seen from the rear side. FIG. 5B is a perspective view of the housing, the lens body and the FOT as seen from the rear side.

FIG. 7A is a perspective view as seen from the rear side. FIG. 7B is a perspective view as seen from a front side.

FIG. 9A is a cross-sectional view taken along a line A-A in FIG. 8. FIG. 9B is a cross-sectional view taken along a line B-B in FIG. 8.

DETAILED DESCRIPTION OF THE EXEMPLARY EMBODIMENTS

Hereinafter, embodiments according to the present invention will be described with reference to the drawings.

Figure 1:
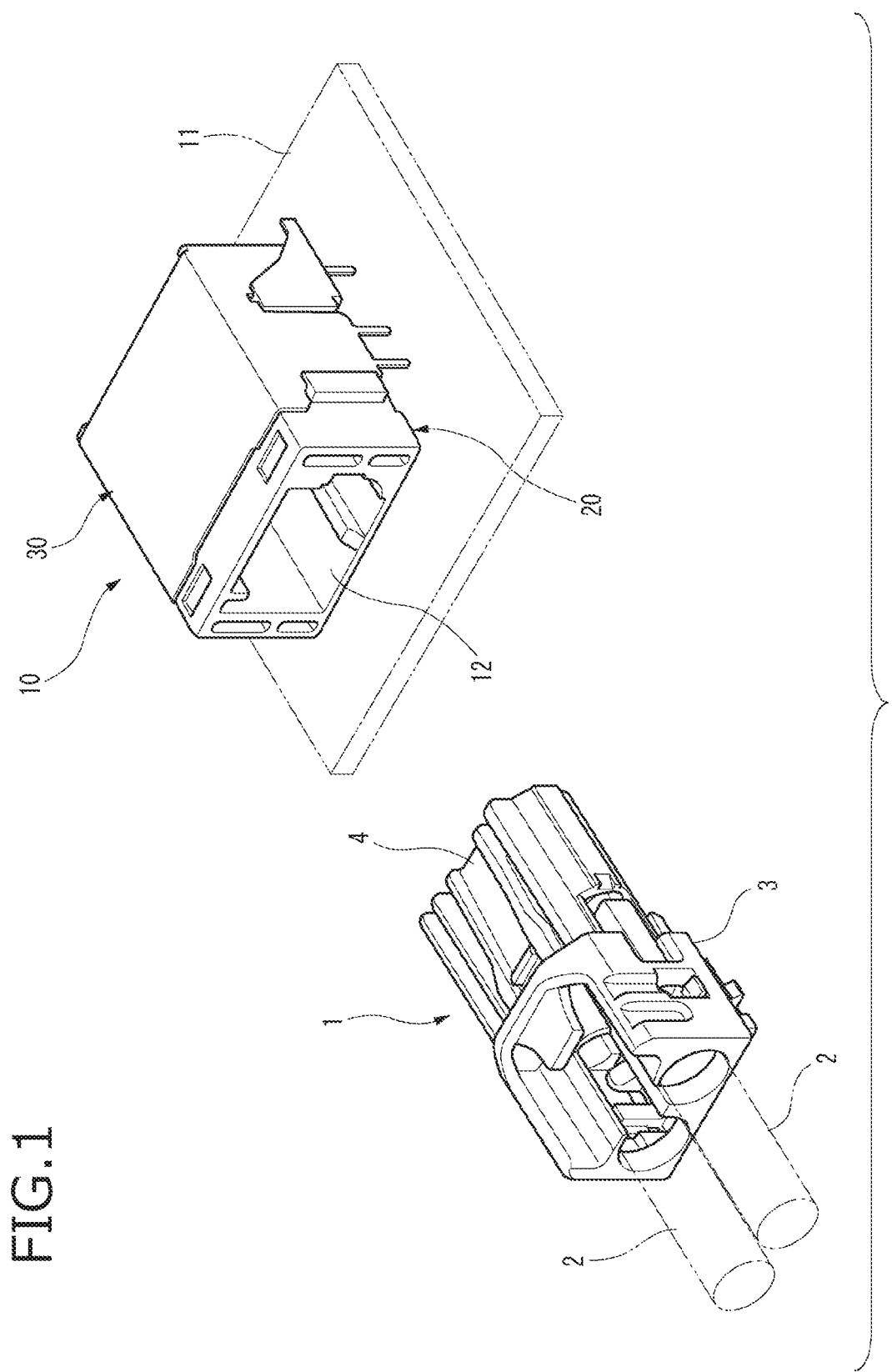
FIG. 1 is a perspective view of an optical connector according to an embodiment and a mating side optical connector.

FIG. 1 is a perspective view of an optical connector according to an embodiment and a mating side optical connector.

As illustrated in FIG. 1, an optical connector 10 according to the present embodiment is a receptacle optical connector to which a mating side optical connector 1, which is a plug connector, is fitted. The optical connector 10 is mounted on a circuit board 11, and the mating side optical connector 1 is fitted into a fitting recessed portion 12 in the optical connector 10.

Figure 2:
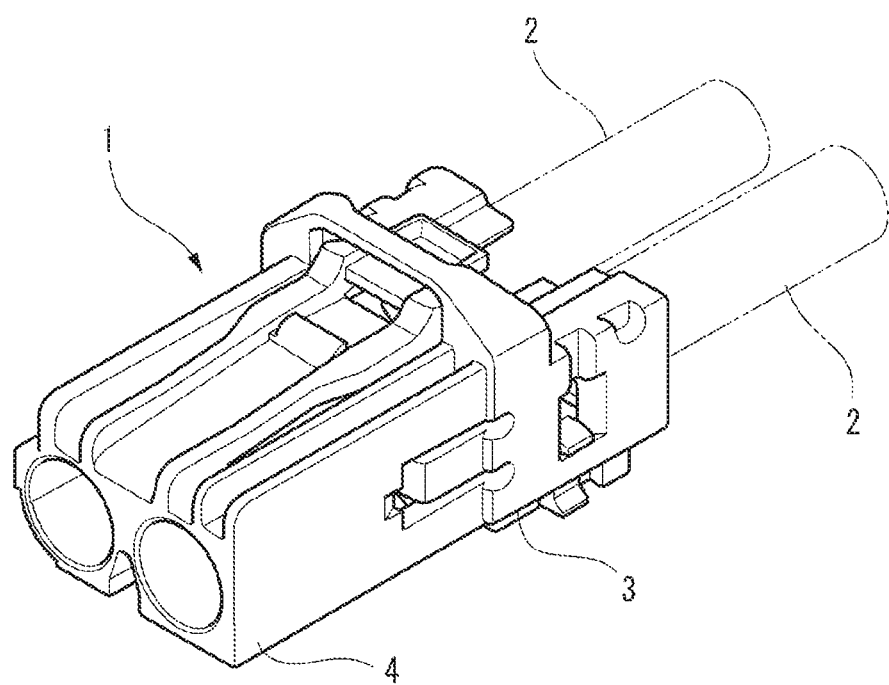
FIG. 2 is a perspective view of the mating side optical connector.

FIG. 2 is a perspective view of the mating side optical connector.

As illustrated in FIG. 2, the mating side optical connector 1 includes a housing 3 connected to an end portion of an optical fiber 2. A front end of the housing 3 is a fitting portion 4, and the fitting portion 4 is fitted into the fitting recessed portion 12 of the optical connector 10. Accordingly, the optical connector 10 and the optical fiber 2 of the mating side optical connector 1 can be in optical communication.

Figure 3:
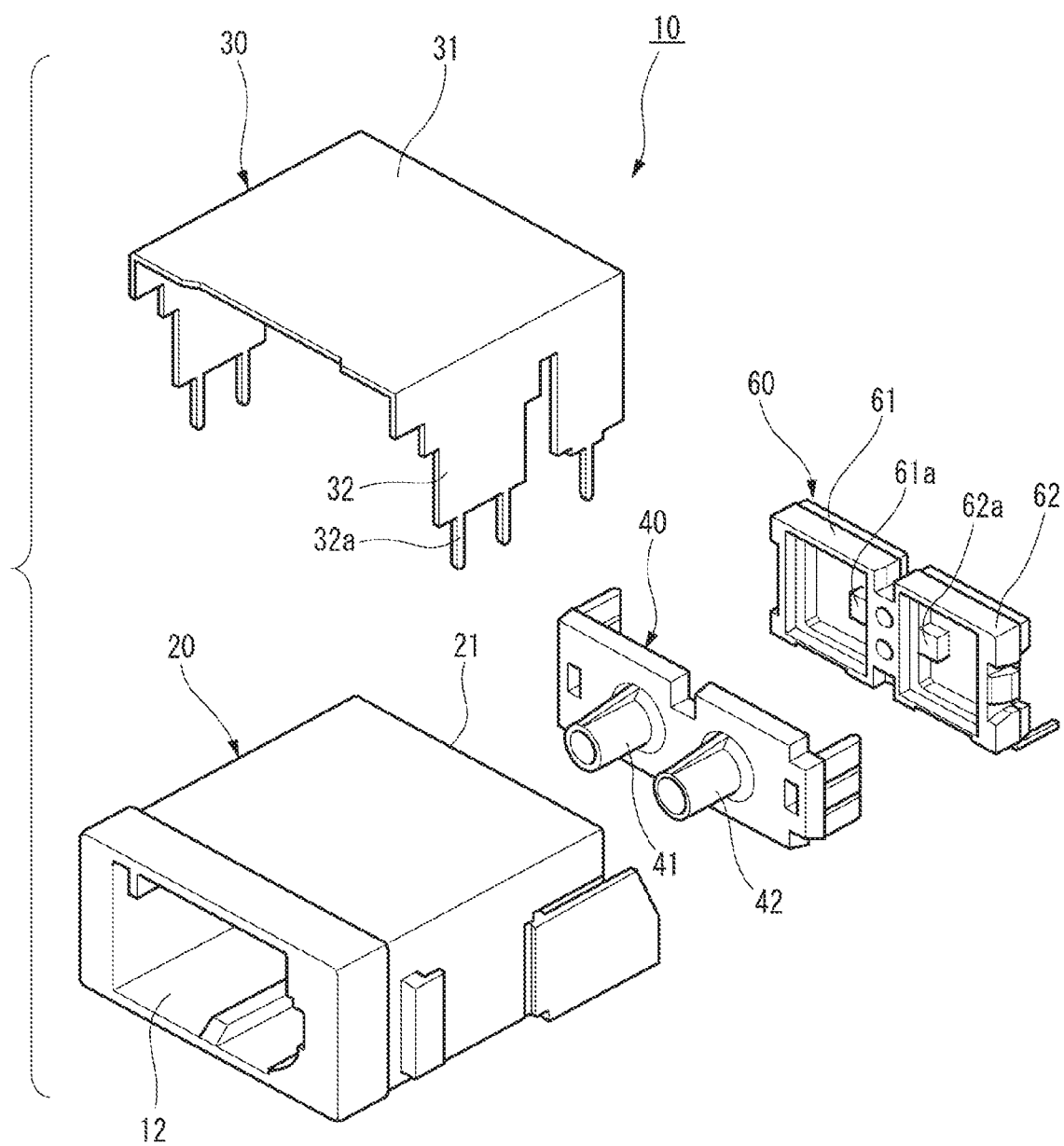
FIG. 3 is an exploded perspective view of the optical connector according to the present embodiment.

FIG. 3 is an exploded perspective view of the optical connector according to the present embodiment.

As illustrated in FIG. 3, the optical connector 10 includes a housing 20, a shield case 30, a lens body 40, and a fiber optic transceiver (FOT) 60 which is an optical conversion module.

The housing 20 has a box shape and is molded from synthetic resin. The housing 20 is formed with the fitting recessed portion 12 into which the fitting portion 4 of the mating side optical connector 1 is fitted on a front end side. The housing 20 is provided with a ferrule (not illustrated) therein, and the end portion of the optical fiber 2 of the mating side optical connector 1 fitted in the fitting recessed portion 12 is fitted into the ferrule. The housing 20 includes an optical module containing portion (containing portion) 21 on a rear end side, and the lens body 40 and the FOT 60 are assembled in the optical module containing portion 21. The shield case 30 is fitted and mounted on the housing 20 from above. A plurality of protruding portions (not illustrated) are formed on a lower portion of the housing 20. The protruding portions are fitted into holes formed in the circuit board 11, so that the optical connector 10 is positioned when being mounted on the circuit board 11.

Figure 4A:
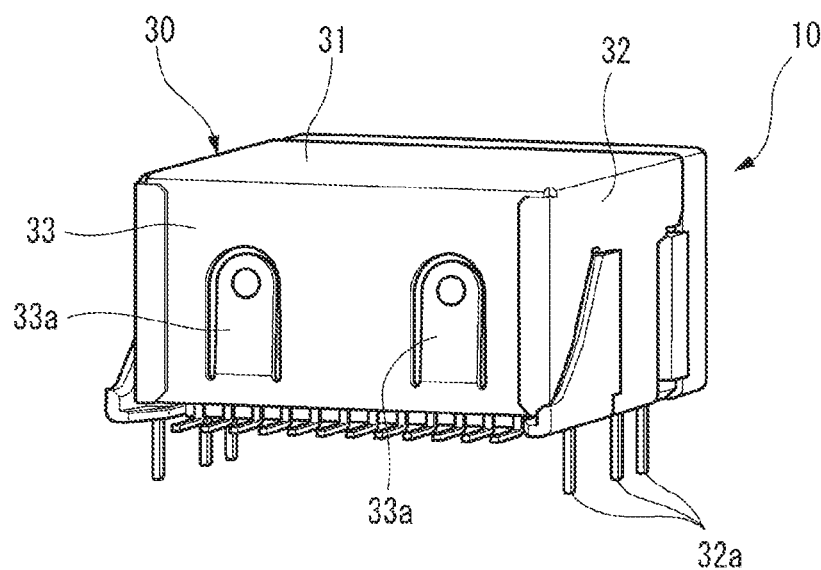
FIGS. 4A and 4B are perspective views illustrating the optical connector.
Figure 4B:
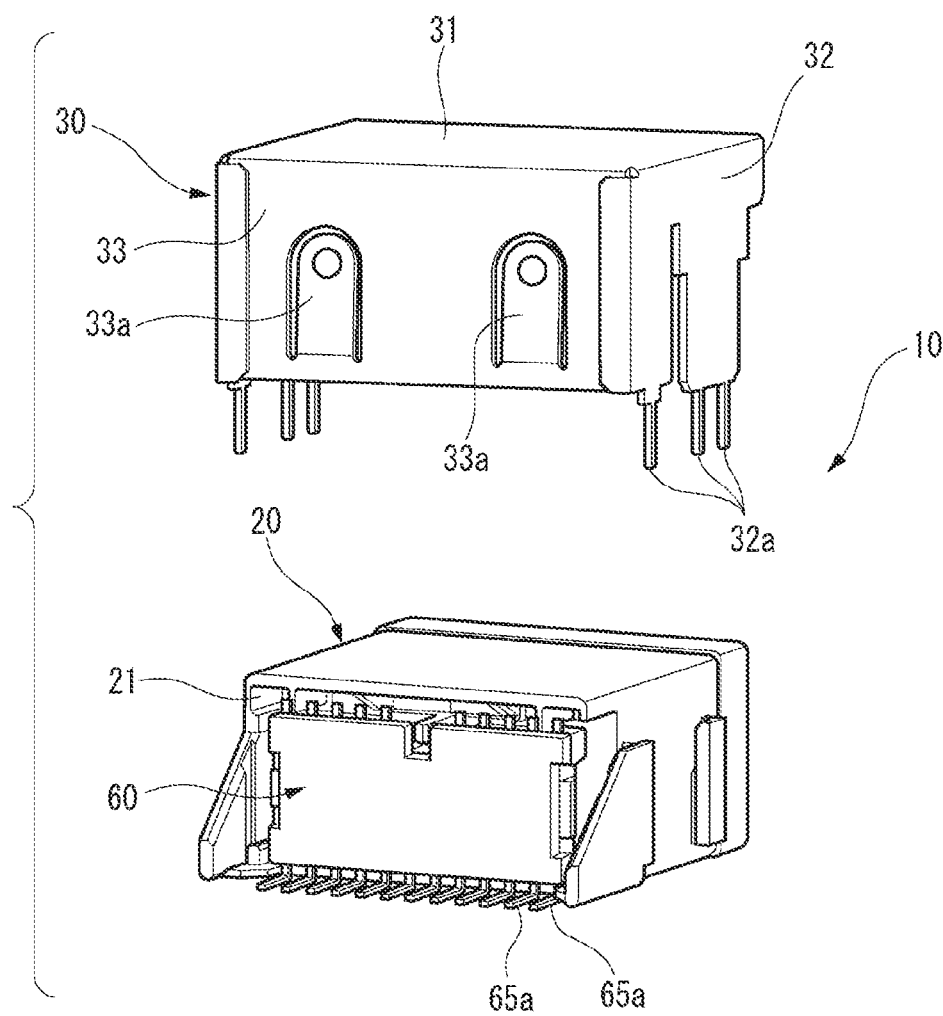

FIGS. 4A and 4B are perspective views illustrating the optical connector. FIG. 4A is a perspective view of the optical connector as seen from a rear side. FIG. 4B is a perspective view of a housing and a shield case as seen from the rear side.

As illustrated in FIGS. 4A and 4B, the shield case 30 is formed into a box shape and includes a top plate portion 31, side plate portions 32 formed on both sides of the top plate portion 31, and a rear plate portion 33 formed on a rear side of the top plate portion 31. The shield case 30 is formed into a box shape by pressing a conductive metal plate or the like. The shield case 30 is attached to the housing 20 so as to cover and shield an upper portion, both side portions, and a rear portion of the housing 20. A plurality of leg portions 32a are formed on the side plate portions 32, and the leg portions 32a are inserted and soldered into through holes (not illustrated) of the circuit board 11. Accordingly, the optical connector 10 is fixed to the circuit board 11. Further, the rear plate portion 33 includes plate spring portions (biasing portion) 33a protruding inward. The plate spring portions 33a press a rear surface of the FOT 60 contained in the optical module containing portion 21 of the housing 20. Accordingly, the lens body 40 and the FOT 60 contained in the optical module containing portion 21 of the housing 20 are maintained to be held in the housing 20 by an biasing force of the plate spring portions 33a.

FIGS. 5A and 5B are perspective views illustrating an optical module containing portion of the housing. FIG. 5A is a perspective view of an optical conversion module and the housing to which a lens body is attached as seen from the rear side. FIG. 5B is a perspective view of the housing, the lens body and the optical conversion module as seen from the rear side.

As illustrated in FIGS. 5A and 5B, the lens body 40 and the FOT 60 are assembled in the optical module containing portion 21 on the rear end side of the housing 20. The optical module containing portion 21 is formed in a recessed shape into which the lens body 40 and the FOT 60 are fitted. The optical module containing portion 21 includes an upper wall portion 23, a bottom wall portion 24, and a pair of side wall portions 25. Further, a bottom portion of the recessed part of the optical module containing portion 21 is an abutment surface 26 in which two lens insertion holes 27 are formed.

Figure 6:
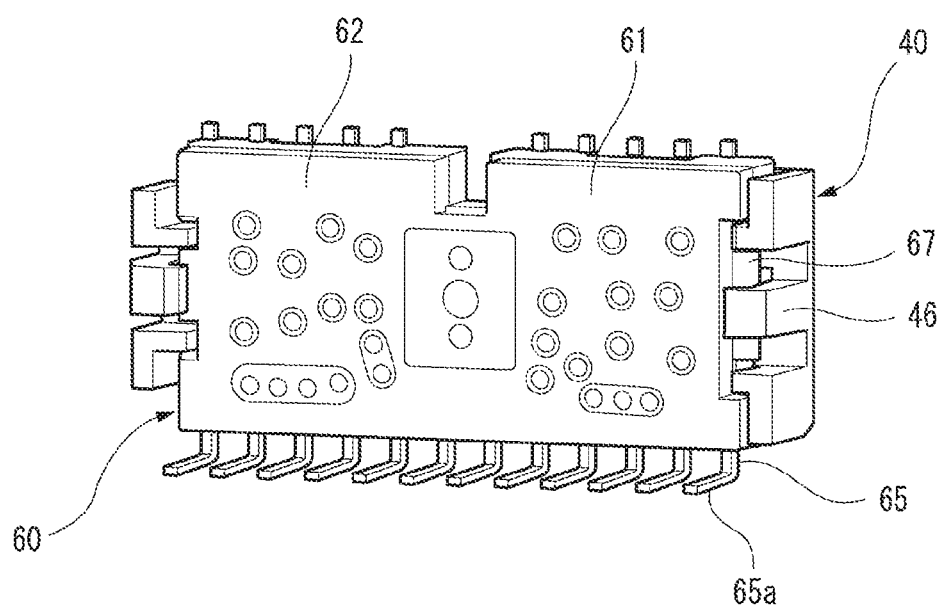
FIG. 6 is a perspective view of the lens body and the FOT which are assembled as seen from the rear side.

FIG. 6 is a perspective view of the lens body and the optical conversion module which are assembled as seen from the rear side.

As illustrated in FIG. 6, the lens body 40 and the FOT 60 are assembled with each other so as to be positioned. The lens body 40 and the FOT 60 are assembled to the optical module containing portion 21 of the housing 20 so as to be assembled with each other. Thereby, the FOT 60 is positioned with respect to the housing 20.

Figure 7A:
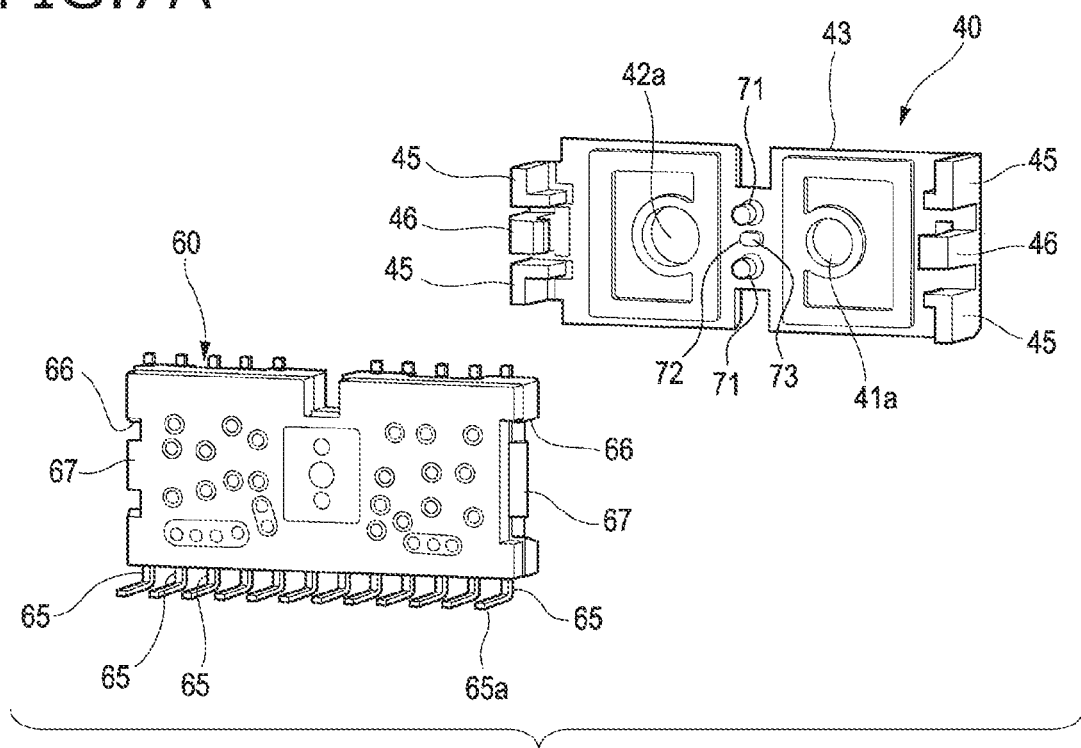
FIGS. 7A and 7B are perspective views illustrating the lens body and the FOT.
Figure 7B:
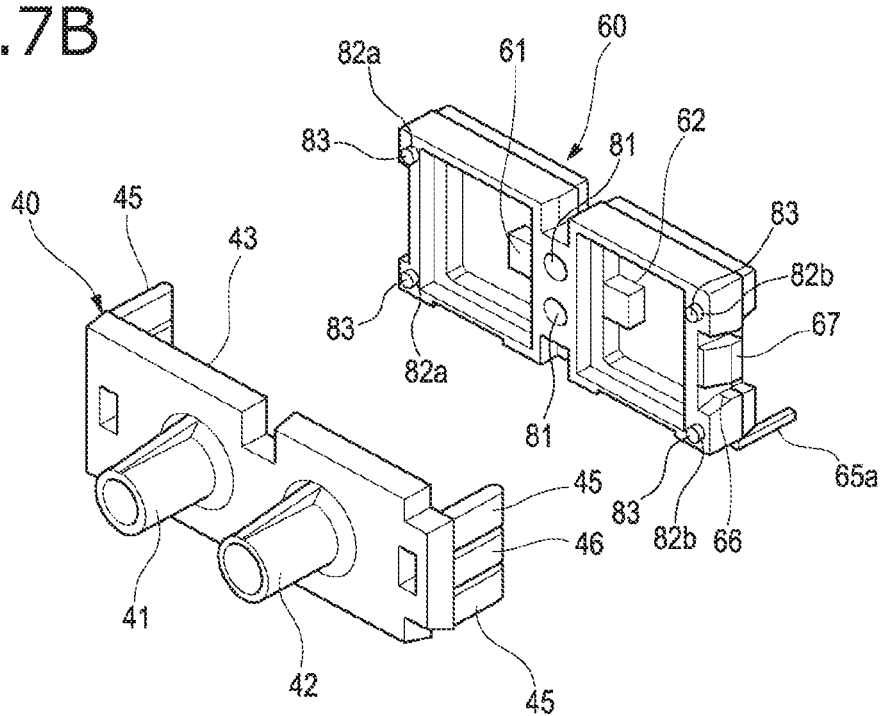

FIGS. 7A and 7B are perspective views illustrating the lens body and the optical conversion module. FIG. 7A is a perspective view as seen from the rear side. FIG. 7B is a perspective view as seen from a front side.

As illustrated in FIGS. 7A and 7B, the lens body 40 includes a substrate portion 43 formed in a rectangular shape in top view, and a light emitting side lens portion 41 and a light receiving side lens portion 42 are formed on the substrate portion 43. The light emitting side lens portion 41 and the light receiving side lens portion 42 are provided side by side. The lens body 40 is integrally formed of transparent resin having light guiding properties, so that the light emitting side lens portion 42 and the light receiving side lens portion 43 are integrally provided to protrude forward from a front surface of the substrate portion 43. An FOT 60 side of the light emitting side lens portion 41 is an incident surface 41a, and an FOT 60 side of the light receiving side lens portion 42 is an emitting surface 42a. The lens body 40 is formed with engagement protrusions 45 and locking claws 46 on both sides of the substrate portion 43. The engagement protrusions 45 are provided on both sides of each of the locking claws 46.

The lens body 40 includes a pair of positioning protrusions 71. The positioning protrusions 71 are provided at a central position of the lens body 40 in a width direction, and are arranged on the lens body 40 in a height direction. Each of the positioning protrusions 71 protrudes toward an FOT 60 side.

The lens body 40 includes an abutment convex portion 72. The abutment convex portion 72 is provided at a central position of the lens body 40 in the width direction and the height direction. The abutment convex portion 72 protrudes toward the FOT 60 side, and an end surface thereof is an abutment surface 73 made of a smooth surface.

The FOT 60 is formed in a rectangular shape in top view, and a light emitting side FOT 61 and a light receiving side FOT 62 are provided side by side on a front surface of the FOT 60. The light emitting side FOT 61 includes a light emitting element which is a light emitting diode (LED), a vertical cavity surface emitting laser (VCSEL), or the like. The light receiving side FOT 62 includes a light receiving element which is a photo diode (PD) or the like. The FOT 60 is integrally formed of synthetic resin, so that the light emitting side FOT 61 and the light receiving side FOT 62 are integrally provided. A plurality of lead frames 65 are provided at a lower portion of the FOT 60. An end portion of the lead frame 65 is a connection portion 65a bent toward the rear side of the FOT 60. The connection portion 65a is disposed and soldered on a pad of the circuit board 11 so as to be electrically connected to a predetermined circuit of the circuit board 11. Recessed portions 66 are formed on both sides of the FOT 60, and a locking piece 67 is provided in the recessed portion 66 so as to protrude therefrom.

The FOT 60 includes a pair of positioning holes 81 on a mounting side to the lens body 40. The positioning holes 81 are formed at a central position of the FOT 60 in the width direction, and are arranged on the FOT 60 in the height direction. The positioning holes 81 are formed at positions corresponding to the positioning protrusions 71 of the lens body 40, so that the positioning protrusions 71 are fitted into the positioning holes 81.

The FOT 60 includes a plurality of abutment convex portions 82a, 82b. The contact convex portions 82a, 82b are provided at four corners of a surface on a lens body 40 side, and protrude toward the lens body 40 side, respectively. An end surface of each of the abutment convex portions 82a, 82b is an abutment surface 83 made of a smooth surface. In the abutment convex portions 82a, 82b, the two abutment convex portions 82a are formed in a vicinity of upper and lower parts near an end portion of the FOT 60 on a light emitting side FOT 61 side, and the two abutment convex portions 82b are formed in a vicinity of upper and lower parts near an end portion of the FOT 60 on a light receiving side FOT 62 side.

The FOT 60 is assembled to the rear surface side including the incident surface 41a and the emitting surface 42a of the lens body 40. At this time, the engagement protrusions 45 of the lens body 40 are engaged with the recessed portion 66 of the FOT 60, and the locking claw 46 of the lens body 40 is locked with the locking piece 67 of the FOT 60. Accordingly, the FOT 60 is assembled to the lens body 40, and the light emitting side FOT 61 and the light receiving side FOT 62 in the FOT 60 are disposed at positions facing the incident surface 41a of the light emitting side lens portion 41 and the emitting surface 42a of the light receiving side lens portion 42 in the lens body 40, respectively.

When the FOT 60 is assembled to the lens body 40, the positioning protrusions 71 formed on the lens body 40 are fitted into the positioning holes 81 formed in the FOT 60. Thereby, the FOT 60 is positioned in a plane direction with respect to the lens body 40.

An assembly of the lens body 40 and the FOT 60 is fitted in the optical module containing portion 21 of the housing 20 from the lens body 40 side and housed so as to be positioned at a predetermined position. Accordingly, the light emitting side lens portion 41 and the light receiving side lens portion 42 of the lens body 40 are inserted into the lens insertion holes 27 of the housing 20, and a front surface of the lens body 40 abuts against the abutment surface 26. Accordingly, the light emitting side lens portion 41 and the light receiving side lens portion 42 of the lens body 40 are contained in the lens insertion holes 27 so as to be positioned on the ferrule inside the housing 20.

Figure 8:
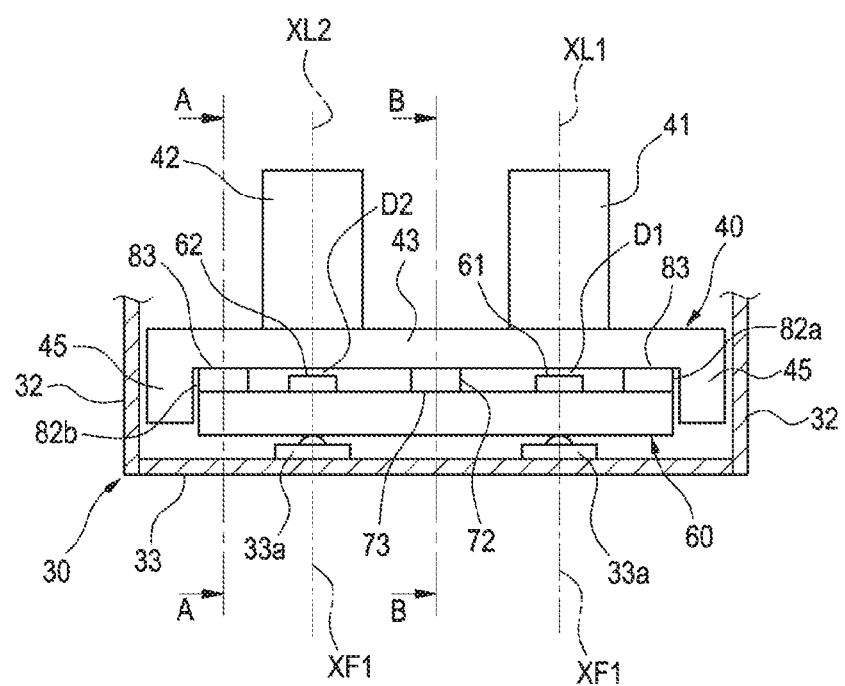
FIG. 8 is a schematic cross-sectional view along a horizontal direction of the optical connector illustrating the assembled state of the lens body and the FOT.
Figure 9A:
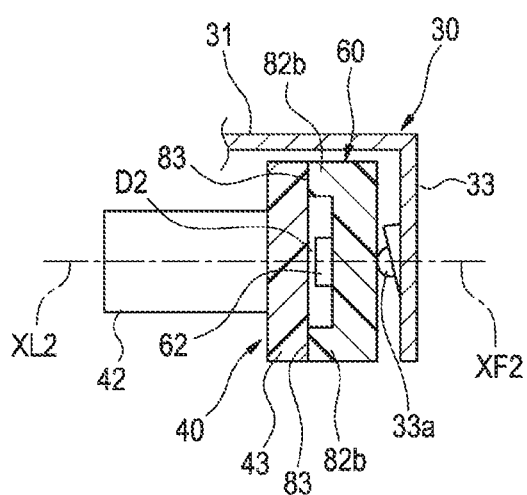
FIGS. 9A and 9B are cross-sectional views illustrating the assembled state of the lens body and the FOT.
Figure 9B:
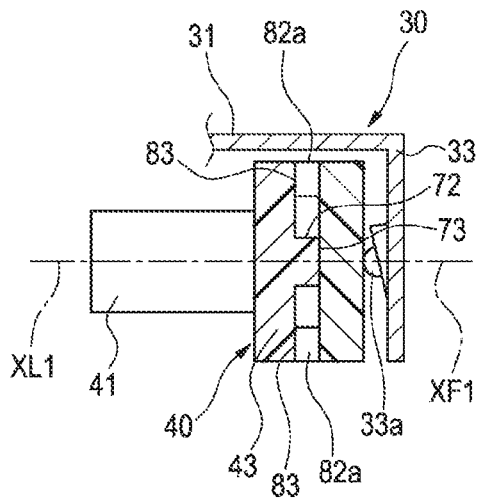
Figure 10:
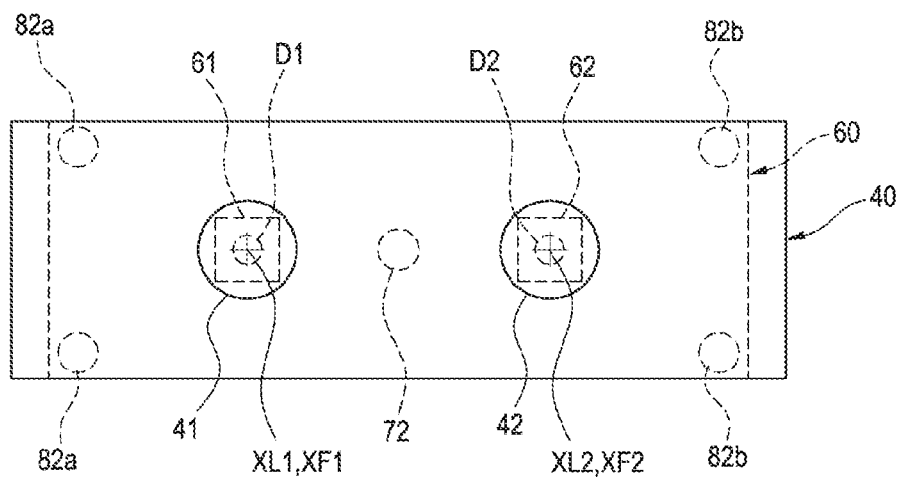
FIG. 10 is a schematic front view of the lens body to which the FOT is assembled.

FIG. 8 is a schematic cross-sectional view along a horizontal direction of the optical connector illustrating the assembled state of the lens body and the FOT. FIGS. 9A and 9B are cross-sectional views illustrating the assembled state of the lens body and the FOT. FIG. 9A is a cross-sectional view taken along a line A-A in FIG. 8. FIG. 9B is a cross-sectional view taken along a line B-B in FIG. 8. FIG. 10 is a schematic front view of the lens body to which the FOT is assembled.

As illustrated in FIGS. 8, 9A and 9B, when the shield case 30 is attached to the housing 20, a back surface side of each of the light emitting side FOT 61 and the light receiving side FOT 62 of the FOT 60 is pressed toward the lens body 40 side by the two plate spring portions 33a formed on the rear plate portion 33 of the shield case 30. Accordingly, the lens body 40 and the FOT 60 are maintained to be held in the optical module containing portion 21 of the housing 20.

When the light emitting side FOT 61 is disposed at a position facing the incident surface 41a of the light emitting side lens portion 41, a light emitting side transmission part D1, in which light emitted from the light emitting side FOT 61 is incident on the light emitting side lens portion 41, is provided between the light emitting side lens portion 41 and the light emitting side FOT 61. Similarly, when the light receiving side FOT 62 is disposed at a position facing the emitting surface 42a of the light receiving side lens portion 42, a light receiving side transmission part D2, in which light from the light receiving side lens portion 42 is received by the light receiving side FOT 62, is provided between the light receiving side lens portion 42 and the light receiving side FOT 62.

When the FOT 60 is biased toward the lens body 40 side by the plate spring portion 33a, the abutment surface 73 of the abutment convex portion 72 formed in the lens body 40 abuts against the central position of the FOT 60 in the width direction and the height direction, and the abutment surfaces 83 of the abutment convex portions 82a, 82b formed on the FOT 60 abut against four corners of the lens body 40. Accordingly, the lens body 40 and the FOT 60 are assembled in parallel to each other with a uniform gap therebetween in a facing direction facing the lens body 40 to the FOT 60.

In the optical connector 10 assembled as described above, as illustrated in FIG. 10, three abutment convex portions 72, 82a including one abutment convex portion 72 of the lens body 40 and two contact convex portions 82a near the end portion of the FOT 60 on the light emitting side FOT 61 side are disposed around a periphery of the light emitting side transmission part D1. Therefore, in the light emitting side transmission part D1, the light emitting side lens portion 41 and the light emitting side FOT 61 are disposed in parallel with high accuracy by the surrounding three abutment convex portions 72, 82a. Therefore, an optical axis XF1 of the light emitting side FOT 61 of the FOT 60 is aligned with an optical axis XL1 of the light emitting side lens portion 41 of the lens body 40.

Similarly, three abutment convex portions 72, 82b including the one abutment convex portion 72 of the lens body 40 and two contact convex portions 82b near the end portion of the FOT 60 on the light receiving side FOT 62 side are disposed around a periphery of the light receiving side transmission part D2. Therefore, in the light receiving side transmission part D2, the light receiving side lens portion 42 and the light receiving side FOT 62 are disposed in parallel with high accuracy by the surrounding three abutment convex portions 72, 82b. Therefore, an optical axis XF2 of the light receiving side FOT 62 of the FOT 60 is aligned with an optical axis XL2 of the light receiving side lens portion 42 of the lens body 40.

In the optical connector 10, an optical signal converted and generated from an electrical signal by the light emitting side FOT 61 of the FOT 60 is incident on the light emitting side lens portion 41 of the lens body 40 from the incident surface 41a and is guided to one optical fiber 2 of the mating side optical connector 1 fitted to the fitting recessed portion 12. Further, an optical signal incident on the light receiving side lens portion 42 from the other optical fiber 2 of the mating side optical connector 1 is emitted from the emitting surface 42a of the light receiving side lens portion 42 of the lens body 40, received by the light receiving side FOT 62 of the FOT 60, and converted into an electrical signal.

The FOT 60 made of synthetic resin is molded, for example, by injecting molten resin into a cavity of a mold. The FOT 60 molded by the injection molding may undergo deformation which is bending, warpage, or the like depending on the cooling condition after molding or the like.

Figure 11A:
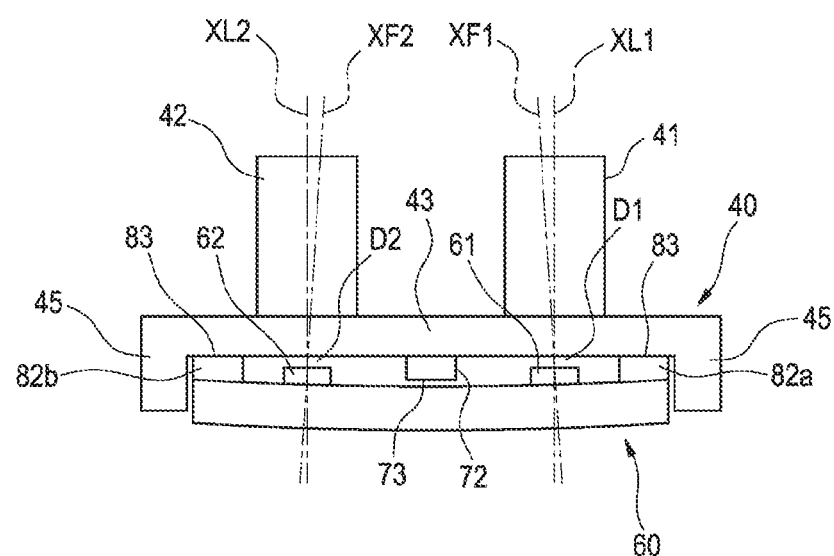
FIGS. 11A and 11B are schematic plan views illustrating states where the FOT assembled to the lens body is bent and warped.

For example, as illustrated in FIG. 11A, when the bent FOT 60 is assembled with the lens body 40, a large gap is generated at a center in the width direction as compared to both ends in the width direction. As a result, the optical axis XF1 of the light emitting side FOT 61 and the optical axis XF2 of the light receiving side FOT 62 of the FOT 60 are inclined inward toward the lens body 40.

Figure 11B:
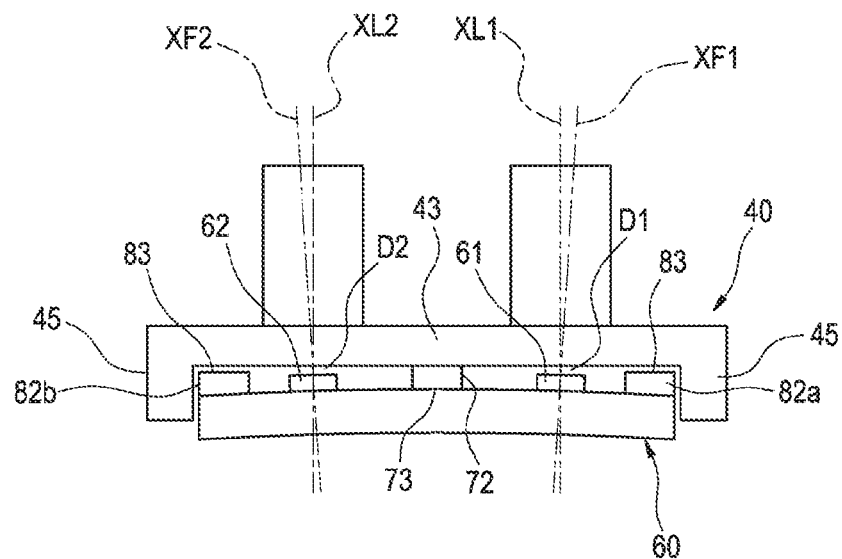

As illustrated in FIG. 11B, when the warped FOT 60 is assembled with the lens body 40, a large gap is generated at the both ends in the width direction as compared to the center in the width direction. As a result, the optical axis XF1 of the light emitting side FOT 61 and the optical axis XF2 of the light receiving side FOT 62 of the FOT 60 are inclined outward toward the lens body 40.

Accordingly, if the FOT 60 undergoes deformation which is bending, warpage, or the like, when the FOT 60 is assembled with the lens body 40, misalignment occurs between the optical axis XL1 of the light emitting side lens portion 41 and the optical axis XF1 of the light emitting side FOT 61, and between the optical axis XL2 of the light receiving side lens portion 42 and the optical axis XF2 of the light receiving side FOT 62. As a result, an optical loss in the light receiving side transmission part D1 between the light emitting side lens portion 41 and the light emitting side FOT 61 and the light receiving side transmission part D2 between the light receiving side lens portion 42 and the light receiving side FOT 62 increases, which leads to a decrease in performance.

However, according to the optical connector according to the present embodiment, when the FOT 60 is biased toward the lens body 40 by the plate spring portions 33a of the shield case 30, the FOT 60 is disposed in parallel to the lens body 40 with a uniform gap therebetween in a direction along the optical axis by the plurality of contact convex portions 72, 82a, 82b. Therefore, even if the FOT 60 undergoes deformation which is bending, warpage, or the like, the FOT 60 can be corrected and disposed parallel to the lens body 40, and the optical axis XF1 of the light emitting side FOT 61 and the optical axis XF2 of the light receiving side FOT 62 of the FOT 60 can be aligned with high accuracy without being inclined relative to the optical axis XL1 of the light emitting side lens portion 41 and the optical axis XL2 of the light receiving side lens portion 42 of the lens body 40. Accordingly, the optical loss generated in the light receiving side transmission part D1 between the light emitting side lens portion 41 and the light emitting side FOT 61 and the light receiving side transmission part D2 between the light receiving side lens portion 42 and the light receiving side FOT 62 can be minimized, and excellent light transmission efficiency can be obtained.

The lens body 40, to which the FOT 60 is pressed, is pressed against the abutment surface 26 of the optical module containing portion 21. Therefore, even if the lens body 40 undergoes deformation which is bending, warpage, or the like, the lens body 40 is also corrected together with the FOT 60, and the inclination of the optical axis XL1 of the light emitting side lens portion 41 and the optical axis XL2 of the light receiving side lens portion 42 of the lens body 40 can also be reduced or prevented.

In particular, the three abutment convex portions 72, 82a are disposed around the periphery of the light emitting side transmission part D1 between the light emitting side lens portion 41 and the light emitting side FOT 61, and the three abutment convex portions 72, 82b are disposed around the periphery of the light receiving side transmission part D2 between the light receiving side lens portion 42 and the light receiving side FOT 62. Therefore, the light emitting side lens portion 41 and the light emitting side FOT 61 serving as the light emitting side transmission part D1, and the light receiving side lens portion 42 and the light receiving side FOT 62 serving as the light receiving side transmission part D2 can be disposed in parallel with high accuracy. Accordingly, the optical axes XL1, XF1 of the light emitting side lens portion 41 and the light emitting side FOT 61 and the optical axes XL2, XF2 of the light receiving side lens portion 42 and the light receiving side FOT 62 can be aligned with high accuracy, and the light loss generated in the light emitting side transmission part D1 and the light receiving side transmission part D2 can be minimized.

The light emitting side FOT 61 and the light receiving side FOT 62 of the FOT 60 are biased by the plate spring portions 33a on the optical axes XF1, XF2, respectively, so that the optical axes XL1, XF1 of the light emitting side lens portion 41 and the light receiving side lens portion 42 and the optical axes XL2, XF2 of the light receiving side lens portion 42 and the light receiving side FOT 62 can be further aligned with high balance and high accuracy.

The invention is not limited to the above embodiment, and may be appropriately modified, improved, or the like. In addition, the material, shape, size, number, arrangement position or the like of each component in the above-described embodiment are optional and are not limited as long as the invention can be achieved.

Figure 12:
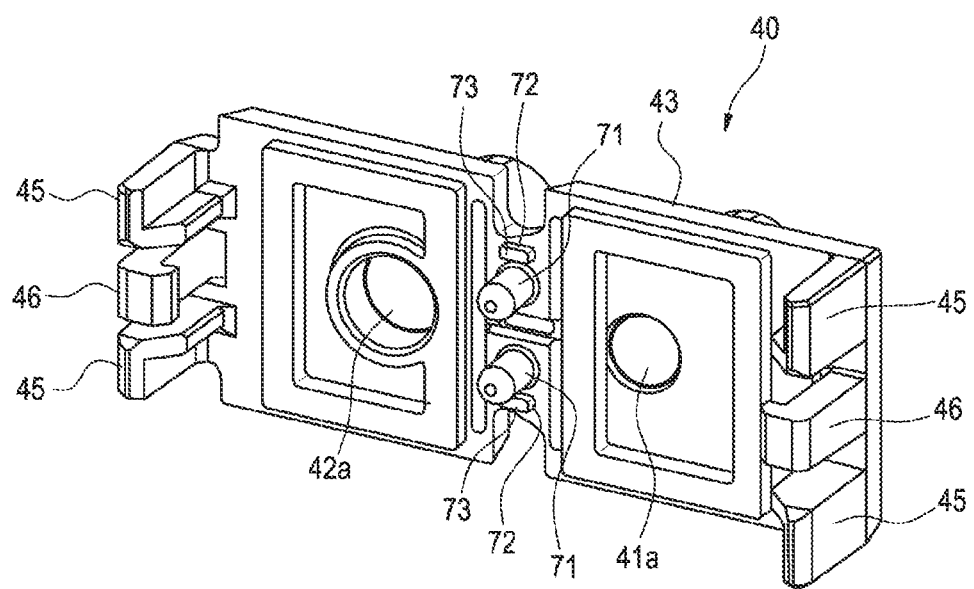
FIG. 12 is a perspective view of another lens body.

The one abutment convex portion 72 is formed at the center of the lens body 40 in the above embodiment. However, for example, as illustrated in FIG. 12, two abutment convex portions 72 arranged in the height direction may be provided at the center of the lens body 40. Accordingly, four support points can be set around the periphery of each of the light emitting side transmission part D1 and the light receiving side transmission part D2. The optical axis XL1 of the light emitting side lens portion 41 and the optical axis XF1 of the light emitting side FOT 61 can be aligned more stably with high balance, and the optical axis XL2 of the light receiving side lens portion 42 and the optical axis XF2 of the light receiving side FOT 62 can be aligned more stably with high balance. The light loss generated in the light emitting side transmission part D1 and the light receiving side transmission part D2 can be further reduced or prevented.

Further, in the above embodiment, the one abutment convex portion 72 is provided on the lens body 40, and the four abutment convex portions 82a, 82b are provided on the FOT 60. However, all the abutment convex portions may be provided on any one of the lens body 40 and the FOT 60.

Here, characteristics of the embodiment of the optical connector according to the present invention described above are summarized briefly in the following [1] to [3], respectively.

[1] An optical connector including:
a lens body (40) having a lens portion (light emitting side lens portion 41, light receiving side lens portion 42);
an FOT 60 having an optical element (light emitting side FOT 61, light receiving side FOT 62) which is provided at a position facing the lens portion (light emitting side lens portion 41, light receiving side lens portion 42) when the FOT (60) is assembled to the lens body (40);
a housing (20) having a containing portion (optical module containing portion 21) in which the lens body (40) and the FOT (60) assembled to the lens body (40) are contained;
a biasing portion (plate spring portion 33a) configured to bias the FOT (60) contained in the containing portion (optical module containing portion 21) toward the lens portion (41,42); and
a plurality of abutment convex portions (72, 82a, 82b) which are provided on at least one of the lens body (40) and the FOT (60) such that the FOT (60) biased toward the lens body (40) by the biasing portion (plate spring portion 33a) is arranged in parallel to the lens body (40) with a uniform gap between the FOT (60) and the optical element (61, 62) in a direction along an optical axis of the optical element (61, 62).

[2] The optical connector according to [1],
in which the lens portion (41, 42) includes a light emitting side lens portion (41) and a light receiving side lens portion (42);
in which the FOT (60) includes a light emitting side FOT (61) facing the light emitting side lens portion (41) and a light receiving side FOT (62) facing the light receiving side lens portion (42); and
in which at least three of the abutment convex portions (72, 82a, 82b) are provided around a periphery of each of a light emitting side transmission part (D1) between the light emitting side lens portion (41) and the light emitting side FOT (61) and a light receiving side transmission part (D2) between the light receiving side lens portion (42) and the light receiving side FOT (62).

[3] The optical connector according to [2],
in which the biasing portion includes a first biasing portion and a second biasing portion (plate spring portions 33a),
in which the first and second biasing portions (plate spring portions 33a) are respectively arranged on optical axes (XF1, XF2) of the light emitting side FOT (61) and the light receiving side FOT (62).

What is claimed is:
1. An optical connector comprising:
a lens body having a lens portion;
a fiber optic transceiver having an optical element which is provided at a position facing the lens portion when the fiber optic transceiver is assembled to the lens body;
a housing having a containing portion in which the lens body and the fiber optic transceiver assembled to the lens body are contained;
a biasing portion configured to bias the fiber optic transceiver contained in the containing portion toward the lens portion; and
at least three abutment convex portions each provided on at least one of the lens body and the fiber optic transceiver to be disposed therebetween such that the fiber optic transceiver biased toward the lens body by the biasing portion is arranged in parallel to the lens body with a uniform gap between the fiber optic transceiver and the lens body in a direction along an optical axis of the optical element.

2. The optical connector according to claim 1,
wherein the lens portion includes a light emitting side lens portion and a light receiving side lens portion;
wherein the fiber optic transceiver includes a light emitting side fiber optic transceiver facing the light emitting side lens portion and a light receiving side fiber optic transceiver facing the light receiving side lens portion; and wherein at least three of the abutment convex portions are provided around a periphery of each of a light emitting side transmission part between the light emitting side lens portion and the light emitting side fiber optic transceiver and a light receiving side transmission part between the light receiving side lens portion and the light receiving side fiber optic transceiver.

3. The optical connector according to claim 2, wherein the biasing portion includes a first biasing portion and a second biasing portion; and wherein the first biasing portion and the second biasing portion are respectively arranged on optical axes of the light emitting side fiber optic transceiver and the light receiving side fiber optic transceiver.

4. The optical connector according to claim 1, wherein the at least three abutment convex portions comprises an abutment convex portion provided at a central position of the lens body and at least two abutment convex portions provided on a lens body side of the fiber optic transceiver.

5. The optical connector according to claim 4, wherein the at least three abutment convex portions comprises four abutment convex portions provided at four corners of a surface on a lens body side of the fiber optic transceiver.

6. The optical connector according to claim 4, wherein the abutment convex portion provided at a central position of the lens body protrudes toward the fiber optic transceiver and abuts the fiber optic transceiver, and the four abutment convex portions protrude toward the lens body and abut against four corners of the lens body to form the uniform gap between the fiber optic transceiver and the lens body.

7. The optical connector according to claim 1, wherein the at least three abutment convex portions comprises at least two abutment convex portions formed near an end portion of the fiber optic transceiver.

8. The optical connector according to claim 7, wherein the at least three abutment convex portions comprises at least two abutment convex portions formed in a vicinity of upper and lower parts near an end portion of the fiber optic transceiver on a light emitting side and at least two abutment convex portions formed in a vicinity of upper and lower parts near an end portion of the fiber optic transceiver on a light receiving side.

9. The optical connector according to claim 1, wherein the at least three abutment convex portions are spaced apart.

10. The optical connector according to claim 1, wherein the at least three abutment convex portions comprises two abutment convex portions arranged in a height direction provided at the center of the lens body.

* * * * *